US011415960B2

(12) United States Patent
Doettling

(10) Patent No.: US 11,415,960 B2
(45) Date of Patent: Aug. 16, 2022

(54) APPARATUS AND METHOD FOR ENERGY-EFFICIENT EXECUTION OF A SAFETY FUNCTION

(71) Applicant: PILZ GMBH & CO. KG, Ostfildern (DE)

(72) Inventor: Dietmar Doettling, Ostfildern (DE)

(73) Assignee: Pilz GmbH & Co. KG, Ostfildern (DE)

( * ) Notice: Subject to any disclaimer, the term of this patent is extended or adjusted under 35 U.S.C. 154(b) by 251 days.

(21) Appl. No.: 16/892,011

(22) Filed: Jun. 3, 2020

(65) Prior Publication Data

US 2020/0379430 A1     Dec. 3, 2020

(30) Foreign Application Priority Data

Jun. 3, 2019   (DE) ................... 10 2019 114 854.5

(51) Int. Cl.
    *G05B 19/406*    (2006.01)
(52) U.S. Cl.
    CPC .. *G05B 19/406* (2013.01); *G05B 2219/50193* (2013.01)
(58) Field of Classification Search
    CPC .................................................. G05B 19/406
    USPC .......................................................... 700/28
    See application file for complete search history.

(56) References Cited

U.S. PATENT DOCUMENTS

| 2010/0161081 A1 | 6/2010 | Seiler et al. |
| 2011/0283126 A1 | 11/2011 | Bartholomeyczik et al. |
| 2015/0049911 A1* | 2/2015 | Doettling ............. G06V 10/255 382/103 |

FOREIGN PATENT DOCUMENTS

| DE | 102008056508 B3 * | 4/2010 | .............. E05F 15/43 |
| DE | 102009047805 A1 | 3/2011 | |
| DE | 102010028828 A1 | 11/2011 | |
| EP | 1965009 A2 | 9/2008 | |
| EP | 2187281 A1 | 5/2010 | |
| EP | 2199881 A1 | 6/2010 | |
| EP | 2256566 A1 | 12/2010 | |

(Continued)

OTHER PUBLICATIONS

DIN EN ISO 13849-1; Safety of Machinery—Safety Related Parts of Control Systems—Part 1: General Principles for Design (ISO 13849-1:2006); Nov. 2006; 97 pages.

(Continued)

*Primary Examiner* — Mohammad Ali
*Assistant Examiner* — Joshua T Sanders
(74) *Attorney, Agent, or Firm* — Miller Johnson

(57) ABSTRACT

An apparatus is described for energy-efficient execution of a safety function used for safeguarding a technical installation. A safety device detects a triggering event of the safety function, and a processing unit executes a safety-related reaction of the safety function based on the detection by the safety device. The apparatus is selectively operable in a first operating mode and a second operating mode. In the first operating mode, the safety device and the processing unit operate according to a first quality level, and, in the second operating mode, at least one of the safety device and the processing unit operates according to a second quality level. The second quality level is lower than the first quality level and at least one of (a) the safety device and (b) the processing unit is operable with a reduced capacity in the second operating mode to save energy.

20 Claims, 3 Drawing Sheets

(56) References Cited

FOREIGN PATENT DOCUMENTS

ES 2285953 A1 * 11/2007 .............. E05F 15/42
JP 2007283450 A * 11/2007

OTHER PUBLICATIONS

DIN EN ISO 12100; Safety of Machinery; Basic Concepts, General Principles for Design—Part 1: Basic Terminology, Methodology (ISO 12100-1:2003); Apr. 2004; 39 pages.

* cited by examiner

APPARATUS AND METHOD FOR ENERGY-EFFICIENT EXECUTION OF A SAFETY FUNCTION

CROSS-REFERENCE TO RELATED APPLICATIONS

This application claims priority to German Application No. DE 10 2019 114 854.5 filed Jun. 3, 2019. The entire disclosure of the application referenced above is incorporated by reference.

FIELD

The present disclosure relates to an apparatus and a method for energy-efficient execution of a safety function.

BACKGROUND

According to DIN EN ISO 13849-1 and DIN EN ISO 12100, the term safety function stands for a safety-related control function of a machine that reduces a risk emanating from the machine to an acceptable level.

For implementing safety functions, mechanical barriers were originally used to block access to the hazardous machine, particularly to protect hazardous areas of machines and industrial installations. Over time, these rigid and inflexible systems have been replaced or supplemented by more complex control systems that can be flexibly adapted to the specific requirements of the machine, especially to the increased requirements of human-machine-interaction.

The complex control systems comprise sensors, actuators as well as communication and control equipment and are designed to detect a situation or triggering event, such as, for example, intrusion into a defined safety area, in the vicinity of a hazardous machine or installation and to trigger a corresponding safety-related reaction. The safety-related reaction may be a control function that eliminates or reduces to an acceptable level the danger to people or objects in the vicinity of the machine.

The use of such complex control systems to protect people and objects requires that the functionality of the control systems is guaranteed and verifiable at all times. The requirements for the individual sensors, actuators as well as communication and control equipment of these control systems, also known as fail-safe (FS) control systems, are therefore higher than for normal control systems (also known as standard systems), which control the installation or machine with regard to their intended function. In many countries, the requirements for fail-safe control systems are specified in standards and directives.

Furthermore, for safety-related equipment energy efficiency is increasingly becoming into focus. Numerous directives and standards require manufacturers to design their products to be as energy-efficient as possible. For example, only electronic components with as little power dissipation as possible should be used and energy efficiency should already be taken into account at the stage of basic circuit design. These general measures, due to the increasing complexity of the individual sensors for safety-related equipment, can at best compensate for a rising energy demand, yet barely contribute to actual energy savings.

In this regard, DE 10 2009 047 805 A1 discloses a standard control system (PLC) which achieves a reduction in energy consumption by switching on or off individual bus participants on a communication bus together or selectively. A technical implementation of this can be found, for example, in EP 2 187 281 A1. However, in both disclosures, safety aspects are not considered.

EP 2 199 881 A1 and EP 2 256 566 A1 also show how energy savings can be achieved in field devices. Here, it is suggested to activate communication units only when they are needed to save energy. However, safety-related aspects have also not been considered in this case.

SUMMARY

It is an object of the present disclosure to provide an apparatus and a method for energy-efficient execution of a safety function, which can be implemented in an energy-saving manner. Further, it is an object to guarantee a high degree of flexibility and at the same time ensure a standard-compliant safety of a technical installation or machine.

According to one aspect of the present disclosure, there is provided an apparatus for energy-efficient execution of a safety function used for safeguarding a technical installation, comprising: a safety device configured to detect a triggering event of the safety function, and a processing unit configured to execute a safety-related reaction of the safety function based on the detection by the safety device, wherein the apparatus is selectively operable in a first operating mode and a second operating mode, and wherein in the first operating mode the safety device and the processing unit operate according to a first quality level, and, in the second operating mode, at least one of (a) the safety device and (b) the processing unit operates according to a second quality level, wherein the second quality level is lower than the first quality level and at least one of (a) the safety device and (b) the processing unit is operable with a reduced capacity in the second operating mode to save energy.

According to another aspect of the present disclosure, there is provided a method for energy-efficient execution of a safety function used for safeguarding a technical installation, comprising: detecting, by a safety device, a triggering event of the safety function; executing, by a processing unit, a safety-related reaction of the safety function based on the detection by the safety device; and operating the safety device and the processing unit in a first operating mode and a second operating mode, wherein, in the first operating mode, the safety device and the processing unit operate in accordance with a first quality level and, in the second operating mode, at least one of the safety device and the processing unit operates with a second quality level, and wherein the second quality level is lower than the first quality level and in the second operating mode at least one of the safety device and the processing unit is operable with a reduced capacity to save energy.

It is therefore an idea of the present disclosure to implement a second operating mode for energy saving, in which the safety device and/or the processing unit can be operated with reduced power. In the second operating mode, part of the intended function, i.e. the provision of a safety function, is retained, but to a reduced extent. The second operating mode is therefore also referred to as reduced operating mode in the following and differs from a standby operating mode, in which the actual safety function can no longer be performed.

The reduced operating mode is distinguished from a standby operating mode in that basic protection of the system to be monitored is ensured, whereby the extent or the type of monitoring (quality) is adapted so that the components involved consume less energy. The energy saving can be achieved through various measures. For example, energy can be saved if, in the case of safety devices and/or processing units that have a high energy requirement in normal operation, parts of the hardware or software are switched off or operated at reduced power.

The inventors recognized that it is advantageous to implement another quality-dependent operating mode in addition to normal operation and standby operation, in which the quality of the safety function can be variably adjusted. In particular, it is advantageous if the quality of the safety function can be adjusted based on an operating mode or state of the monitored installation.

The quality of a safety function describes the extent to which the triggering event is detected by the safety device or the possibility of processing the detection and causing the safety-related reaction. Since the requirements for a safety function can depend on, among other things, an operating state of the installation to be monitored, it is also possible to adapt variably the quality of the safety function to the respective operating state. For example, different requirements are placed on the safety function in the event of a production stop or a rest period of the installation than in normal operation. Generally, the requirements are lower in the event of a production stop, since the technical system or its components are in a resting state from which no or only slight danger emanates. On the other hand, higher demands may be placed on the safety function during so-called set-up operation or maintenance of the installation, as operating personnel may have to be present directly at the technical installation in its danger zone.

It is understood that the above-mentioned link between an operating mode of the technical installation and requirements for the safety function is only one example. In principle, the required quality of the safety function or variability depends on an individual safety assessment, whereby further parameters besides the operating mode of the technical installation can be relevant for determining the required quality.

Energy savings can be achieved in safety-related equipment due to a quality level that is variably adjustable. Especially during non-production periods, energy can be saved without completely losing the safety function. In addition, the reduced operating mode can also have a beneficial effect on the service life of the sensor system or its maintenance intervals, which can be extended or increased. At the same time, despite the savings, a standard-compliant safety can be achieved by considering the reduced operating mode in the safety assessment.

In a further refinement, the first quality level and the second quality level are defined by a reaction time and/or a detection capability of the safety device and/or the processing unit, and wherein in the second operating mode the reaction time and/or the detection capability is reduced.

Reaction time and detection capability are two parameters, which can determine the quality of a safety function. For example, optical sensors can be operated with different resolutions, whereas a lower resolution simplifies the processing of the acquired data and can be done with less computing power. Thereby, less energy is required for the execution of the safety function. Similarly, the computing power can be reduced if a reaction time is increased and thus more time is available for evaluation. Reduced detection capability or an extended reaction time are thus examples of reduced quality which can lead to energy savings, but at the same time can be compensated for in terms of safety if the state of the technical installation allows it, i.e. the system is in a state in which a reduced quality of the safety function is sufficient for safety in accordance with the relevant standards.

In a further refinement, the device can optionally be operated in a third operating mode in which detection by the safety device and/or execution by the processing unit are deactivated.

In various implementations, in addition to the first operating mode (normal operating mode) and the second operating mode (reduced operating mode), the device can also be operated in a third operating mode (standby operating mode). In standby operating mode, the function of the device is temporarily disabled, but can be quickly reactivated. Energy consumption in standby operating mode is thus even lower than in reduced operating mode, but standby operating mode can only be assumed for a few selected states of the technical installation, as safety cannot be guaranteed in standby operating mode. Generally, standby operation can only be assumed if the technical installation is switched off, although this also depends on the individual safety assessment. In principle, due to the further operating mode, i.e. the reduced operating mode, flexibility in energy saving can be increased and further savings potential can be exploited.

In a further refinement, the reduced capacity of the safety device and/or the processing unit includes a reduction of the clock frequency, a shutdown of one or more processor cores, a reduction of a fan speed and/or a deactivation of software modules.

In order to reduce the capacity and thus the energy consumption, various known measures can be used. Advantageously, lowering the requirement for the safety function, i.e. assuming the second operating mode, automatically leads to the desired energy saving, as the hardware and software react to the lower requirements in a specific manner. Accordingly, no or only minor hardware and software modifications are required to achieve energy savings in reduced operating mode and the focus can be placed entirely on the safety-related definition of the reduced operating mode and the determination of the necessary parameters.

In a further refinement, the safety device and/or the processing unit are of multi-channel design and the reduced capacity of the safety device and/or the processing unit is achieved by switching off one or more channels.

Safety-related equipment is usually designed with multiple channels to ensure redundancy. Each channel can trigger the safety-related reaction independently of the other. At the same time, one channel can check the functionality of the other channel. To save energy, one channel can be switched off according to this refinement, so that the basic function is initially retained, yet redundancy is at least partially dispensed with. By deactivating a channel completely, the safety classification is altered in a safety-related view, which may be acceptable in certain situations depending on a risk analysis of the technical installation. Deactivating a channel is particularly easy to be achieved, making the reduced operating mode particularly easy to implement.

In a further refinement, the apparatus is configured to receive a control command from a separate controller and to select the first or the second operating mode base on the control command.

In this refinement, the transition between the individual operating modes is managed, i.e. the apparatus receives information from a higher-level control system of the technical installation to assume the reduced operating mode (or standby operation), e.g. in the event of a production stop or a break. The information can be transmitted via a safe bus system or network, as a safety integrity level of the safety function is changed. By delegating control, the reduced operating mode can be realized without any further adaptation on the safety device and/or processing unit.

In a further refinement, the apparatus has means to switch automatically between the first and second operating mode.

In this refinement, the transition between the individual operating modes is thus automatic, as the apparatus automatically recognizes which operating mode to adopt to in a given situation. The apparatus can thus react flexibly and quickly and further energy saving potential can be exploited.

In particular, the apparatus may be configured to report information on the selected operating mode to other devices.

Thereby, other equipment (safe and non-safe equipment) can adjust to the reduced operating mode and react accordingly. For example, other devices can send a wake-up call to actively put the apparatus back into normal operation, or switch to the reduced operating mode themselves to save additional energy.

In a further refinement, the safety device has at least one imaging sensor.

Imaging sensors can usually capture more information than is necessary for the actual safety function. The further information can be used additionally to recognize the necessary operating mode automatically. Furthermore, an imaging sensor can be variably adjusted by changing its resolution. By changing the resolution, the effort for an evaluation can be influenced and thus its energy demand. Thereby, the quality of the safety function can be varied easily and quickly via a setting parameter of the safety device.

In a further refinement, the safety device is configured to detect a movement of an object outside a defined safety space, within which the safety function is defined, and to switch between the first and second operating mode depending on this detection.

In this refinement, the safety device, e.g. an imaging sensor, is able to check whether movements are taking place in a viewing area of the safety device. If for a longer period there is no movement in the environment of the technical install, a production stop or a rest period can be assumed. The apparatus can then be induced to switch into the reduced operating mode. In the same way, if a movement occurs again in the environment, it can be an indicator to change from the reduced operating mode to normal operation, as e.g. production starts again. A transition between operating modes can thus be made easily, flexibly and automatically, and energy savings can be further optimized.

In a further refinement, the safety device is configured to detect brightness information and to switch between the first and second operating mode based on this detection.

In this refinement, brightness information is relevant for causing a transition from one operating mode to another. For example, the safety device can register an abrupt change in the lighting of the technical installation and thus indicate a production stop or start, since, for example, the hall lighting is switched off or on. Since automatic switching on and off is already an established energy-saving measure in many production facilities, additional energy can be saved in this refinement.

In a further refinement, the safety device is configured to detect a defined gesture of a person, in particular in a contactless manner, and to switch between the first and second operating mode based on this detection.

In this refinement, a transition from one operating mode to another can be actively triggered by an operator of the installation. Advantageously, the sensors of the safety device can be used to detect the defined gesture of the operator. An additional device is thus not required. For example, an operator can use a defined arm movement to inform the device that a production break is imminent or that production will be continued. The refinement thus contributes to a further increase in flexibility.

In a further refinement, a defined safety space within which the safety function is carried out is variably adjustable and comprises at least a first safety space and a second safety space, wherein, in the first operating mode, the safety device is configured to detect the triggering event in the first and second safety space and in the second operating mode only in the first safety space.

According to this refinement, it is possible to limit monitoring to certain spaces. This has the advantage that monitoring can be set flexibly and energy can be saved if only part of the protected area needs to be monitored. According to this refinement, further energy saving potential can be exploited.

In a further refinement, the apparatus is configured, in the second operating mode, to switch from the second operating mode to the first operating mode if the triggering event is detected in the first safety space.

According to this refinement, for example, only an access area to a machine can be monitored in reduced operating mode, yet not the whole safety space of the installation. A triggering event in the access area can then cause the apparatus to switch from reduced operating mode to normal operation and monitoring of the safety space of the machine can be started. Further energy saving potential can be exploited through this automation.

In a further refinement, the choice of the first or second operating mode depends on an operating mode and/or condition of the technical installation.

In this refinement, the choice of the operating mode of the apparatus is linked to an operating mode and/or condition of the technical installation. Since a safety assessment depends largely on the condition of the technical installation, the quality of the safety function can be directly adapted to the actual safety-related requirement. The apparatus can thus be flexibly adapted to the required safety-related conditions and, for a given state, only guarantee the safety that is required in this state. Thereby, further energy saving potential can be exploited.

It goes without saying that the features mentioned above and those to be explained below can be used not only in the combination indicated in each case, but also in other combinations or on their own, without leaving the scope of the present disclosure.

BRIEF DESCRIPTION OF THE DRAWINGS

Embodiments of the disclosure are shown in the drawings and are explained in more detail in the following description.

DETAILED DESCRIPTION

Figure 1:
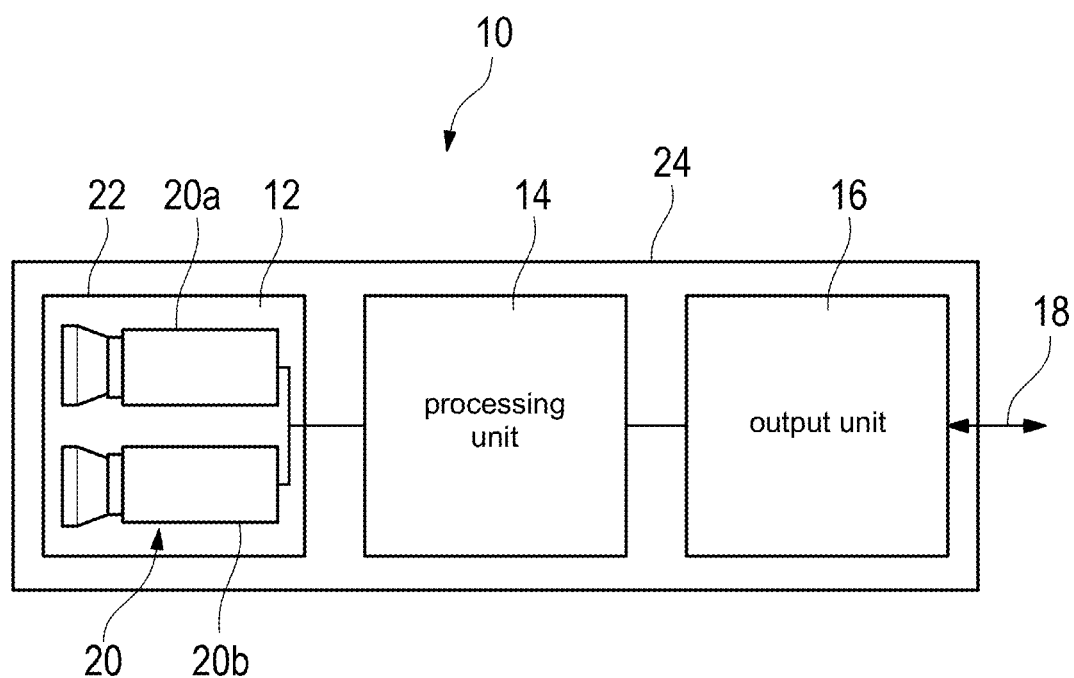
FIG. 1 is a schematic diagram of an apparatus according to various embodiments.

FIG. 1 shows an example embodiment of an apparatus for energy-efficient execution of a safety function. The apparatus is designated in its entirety by reference numeral 10. The apparatus comprises a safety device 12 for detecting a triggering event of the safety function as well as a processing unit 14 for executing a safety-related reaction based on the detection by the safety device 12.

In addition, the apparatus can comprise an input and output unit 16 and/or a communication interface 18, which is used by the processing unit 14 to perform the safety function. For example, the input and output unit 16 can connect the apparatus directly to the technical installation to be monitored in order to switch it off or otherwise shut it down in the event of a hazardous situation indicated by the processing unit.

Alternatively, the information provided by the processing unit 14 can be transmitted via the communication interface 18, e.g. a safe bus or network interface, to a machine controller, which can influence the machine movement in such a way that no more danger emanates from it. Influencing may include a reduction in the speed of movement, a change in direction of movement, and the partial or complete stop of the machine and may vary according to the type of triggering event.

As shown in FIG. 1, the safety device 12 can comprise a sensor unit with an imaging sensor 20 to detect optically a triggering event for a safety function in a defined safety area. In particular, the imaging sensor 20 can be composed of two or more cameras 20a, 20b offset to each other in order to detect a safety area of spatial dimension using stereoscopy. For example, the triggering event can be the intrusion of an object or a person into the safety area.

In the case of an imaging sensor 20 with several cameras 20a, 20b, the cameras 20a, 20b can be arranged in a common housing 22, in order to enable factory side calibration. The further components of the apparatus 10 may also be arranged together in a common housing 24. Moreover, it is also conceivable that the individual components are distributed functionally or structurally over different devices.

The processing unit 14 is a computing unit, which processes the data recorded by the safety device 12 and triggers a corresponding reaction. The computing unit can comprise an input and output, a memory and a central processing unit (CPU). For example, the computing unit can be configured as a microcontroller or System-on-Chip (SoC) in the form of an integrated unit. In particular, the computing unit can be designed redundantly and provide two or more parallel processing channels that can operate independently of each other.

The data processing can in particular be image processing, which cyclically evaluates image data provided by the safety device. The evaluation can include the detection and interpretation of changes in the image data, based on which conclusions can be drawn about concrete situations in a defined safety area. Image processing thus makes it possible to concretize and classify an event detected by the safety device, thereby enabling a situation-dependent execution of the safety-related reaction.

Both the acquisition by the safety device 12 and the processing of the acquired data by the processing unit 14 can be carried out with different levels of quality. For example, the safety device 12 can be operated with different resolutions and thus detect a triggering event with different accuracy. For example, a detection with a first resolution (first quality) can detect objects of the size of a human hand, while detection with a second resolution (second, reduced quality) can only detect a whole person. It is understood that different resolutions can only be an example of different quality.

Similarly, processing by processing unit 14 can be carried out with varying degrees of quality, e.g. by evaluating the image data not pixel by pixel but in larger clusters, or by slowing down the overall processing speed by providing fewer computing resources.

The operation of the safety device 12 or the processing unit 14 with reduced quality in accordance with the disclosure is referred to as reduced operating mode. Reduced operating mode is characterized by the fact that a safety-relevant function is retained, albeit to a limited extent, such that the technical installation can be safeguarded in accordance with relevant standards even in reduced operating mode. At the same time, measures can be taken during reduced operating mode that lead to energy savings in the safety-related equipment. In this case, the reduced operating mode can lead directly to energy savings or enable other energy-saving measures that reduce the overall energy consumption.

Energy-saving measures can include, for example, reducing the clock frequency of a processor, switching off individual processor cores, reducing or switching off fans and/or deactivating hardware and software modules that are no longer required. Another way of saving energy in safety-related equipment can be achieved by switching off individual or several processing channels. The consequence of the energy saving can be that in reduced operating mode, individual safety-related requirements can be partially or not at all fulfilled, so that the reduced operating mode has to be assessed separately in a safety-related assessment. Generally, in reduced operating mode either the response time is extended or the respective safety classification is changed. However, depending on a risk analysis of the installation, this may be acceptable in certain situations.

In addition to the reduced operating mode, it is also conceivable that the apparatus changes to a standby operating mode. In standby operating mode, the safety-relevant function is deactivated, e.g. by switching off safe outputs. This can further reduce power consumption. For example, the power consumption of safety-related equipment can be reduced to 2 to 10% of normal consumption by switching off all unneeded components. Especially in processor-based systems, for example, a current state can be stored in the main memory and the processor can be put into a "sleep" mode in which it requires little energy and cooling can be deactivated. A quick start into normal operation is thus possible at any time and can be achieved in a short time. However, a safety function cannot be guaranteed during standby operating mode.

The transition between the individual operating modes can either be externally managed or initiated by the apparatus itself. Managed in this context means that the apparatus is put into the respective operating mode by a higher-level control system. This has the advantage that a reduced operating mode of safety-related equipment can be controlled centrally.

Alternatively, or in addition, the apparatus can also automatically detect the respective operating mode, e.g. by checking whether changes have occurred in the detection range of the safety device. When using an imaging sensor 20, for example, it can check whether movements can be detected in the field of view. Automated production systems are characterized by the fact that defined parts, e.g. robot arms, are continuously in motion. Characteristic of installations can also be that materials are continuously added or operators are present at the machine. If no movement can be detected in the field of view for a longer period of time, the apparatus can infer a production stop or a rest period and initially switch to reduced operating mode and, if applicable, to standby operating mode after a longer period of time.

While the safety device 12 has been shown above essentially as an imaging sensor, other safety devices are also conceivable in other embodiments. In particular, other safety devices may be used which are able to acquire further information in addition to the detection of the safety-initiating event. For example, the safety device can also be a safety mat, which in addition to the actual actuation can also determine the position of the actuation. As with a safety camera, various areas can be defined, whereby a quality level can be determined by the size or number of defined areas.

Figure 2:
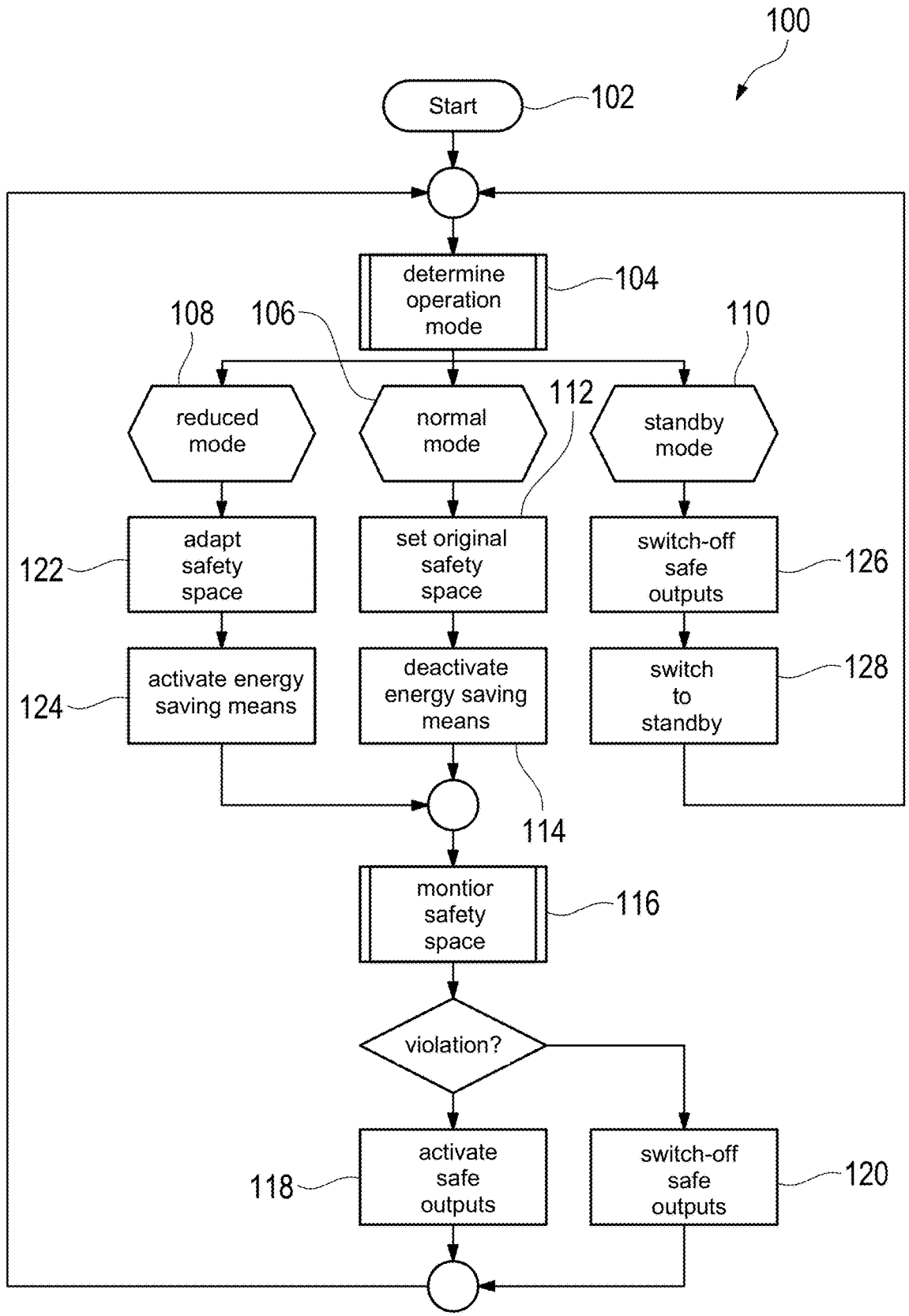
FIG. 2 is a schematic representation of a method according to various embodiments.

FIG. 2 shows in a schematic view an evaluation cycle of an apparatus according to various embodiments.

After start (step 102), the evaluation cycle 100 cycles in a loop after the start (step 102) and first checks which operating mode is to be activated (step 104). The operating mode can either be specified by an external controller via a safe bus or network, or the safety device can determine the respective operating mode, e.g. by detecting movements in a defined safety space. In the example embodiment shown here, the apparatus can assume three operating modes: normal operating mode 106, reduced operating mode 108 and standby operating mode 110.

In normal operating mode 106, default settings are first restored. This may involve, for example, setting defined safety spaces to their original position and size (step 112). Furthermore, all energy-saving measures can be deactivated (step 114). Afterwards, monitoring of the safety space (step 116) begins, which includes detecting whether objects or persons are present within the safety space. If there is no violation of the safety space, the apparatus can be set to normal operations, e.g. by activating safe outputs or leaving them in the switched-on state (step 118).

However, in the event of a violation of the safety space, normal operating mode is not assumed, i.e. any safe outputs remain switched off, which leads, for example, to a standstill of the installation (step 120). It is understood that the switching-off of outputs is only one example and other safety-related measures can be taken equally well.

Following the selection, the evaluation cycle 100 repeats and first it is checked whether the operating mode should be changed (step 104). As before, this can be specified externally or determined by the apparatus itself. If there are now sufficient conditions fulfilled for setting reduced operating mode 108, a possible adaptation of the safety space (step 122) is first carried out to adjust the monitoring to the reduced operating mode. In particular, safety spaces can be enlarged so that longer reaction times, which may be caused by the reduced operating mode, can be compensated. Typically, the safety distances increase, so that the safety spaces must be located further away from the source of danger.

Subsequently, the energy-saving measures, such as a reduction in fan speed, switching off processor cores, suspending diagnostic functions, etc., can be activated (step 124). The apparatus then continues to carry out the safety function, but with reduced quality, so that more time may be required for detection and processing. The technical installation, however, can commence operation (step 118).

Optionally, in a further loop of the evaluation cycle 100, the apparatus can also go into a standby operating mode 110, in which the safety function is completely deactivated. In this case, all safe outputs are switched off (step 126) a first to ensure no danger to persons or objects emanates from the technical installation. Furthermore, additional energy-saving measures can be activated compared to reduced operating mode 108, such as switching the processing unit to standby operating mode (step 128).

Transition from standby operating mode 110 to normal operating mode 106 or reduced operating mode 108 can only be made by an external signal, as the system is in "safe state" and all movements are stopped.

It goes without saying that in addition to the three operating modes mentioned above, further operating modes are conceivable. In particular, mixed forms are conceivable in which, for example, parts of the apparatus are in a reduced operating mode 108, while other parts are in standby operating mode 110. For example, a processing channel of a safety-related equipment can be in reduced operating mode 108 and pass through the evaluation cycle 100 accordingly, while another channel is in standby operating mode 110. In this case, one channel can "wake up" the other channel so that the device can go back to normal operating mode 106 or reduced operating mode 108. Thereby, further energy saving potential can be exploited.

Figure 3:
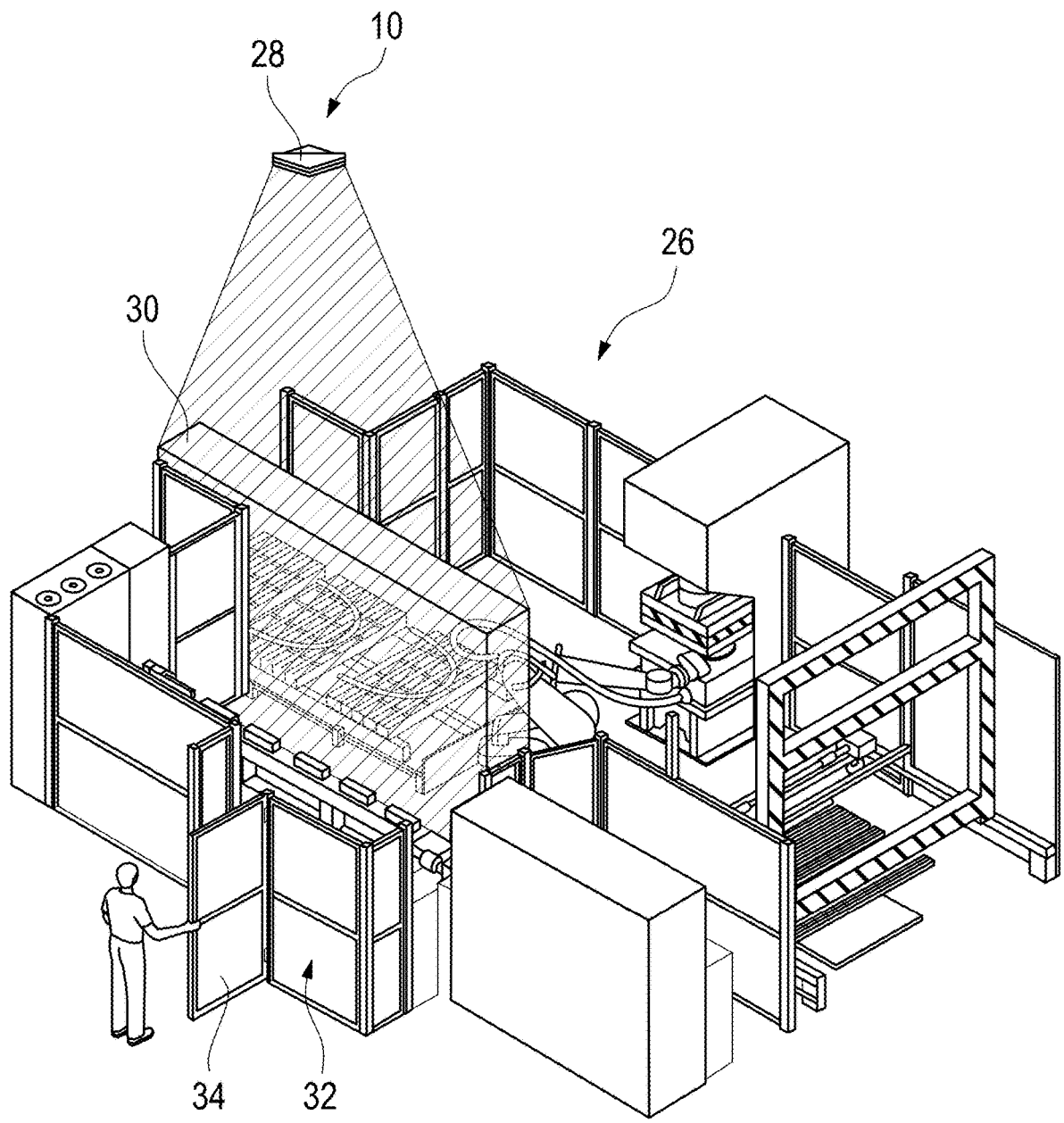
FIG. 3 is an illustration of an application scenario for an apparatus and a method according to an embodiment of this present disclosure.

FIG. 3 shows an application scenario of an apparatus and a method according to various embodiments of the present disclosure.

FIG. 3 shows, as an example of a technical installation 26, an industrial production plant that is monitored by an apparatus 10 in accordance with this disclosure. Here, the apparatus is a safety camera system 28, which is located above the technical installation 26 and has at least two imaging sensors that take pictures of the installation and its surroundings from a bird's eye view.

Furthermore, the apparatus comprises a processing unit (not shown here) which evaluates the image data provided by the safety camera system. The evaluation concentrates on detecting changes in certain sections of the images taken to determine if a person has entered the safety areas of technical installation 26.

By using two cameras and stereoscopic evaluation, a three-dimensional safety space 30 can be defined. The safety space 30 is indicated here as an example in the form of a cuboid space directly in front of the technical installation 26. As soon as a person enters the safety space 30, the image data changes and the processing unit can trigger a safety-related reaction. For example, a signal can be sent to a controller of the technical installation 26 so that it stops or slows down its operation. Alternatively, the processing unit may directly act on a power supply of the technical installation 26 to shut down the technical installation 26 immediately.

In various implementations, to satisfy the general safety requirements, the processing unit has two channels, each evaluating the image data independently of the other. If one channel fails, the safety-related reaction can be executed by the remaining channel. In addition, the channels can check each other's functionality.

The requirement for the safety function is determined by a risk assessment. Different requirements can be defined for the safety function in different operating states of the technical installation 26. The apparatus according to the disclosure can adapt to the different requirements.

For example, in a reduced operating mode of the apparatus 10, the monitoring can be limited to an access area 32 of technical installation 26. In the meaning of this disclosure, the access area 32 is then a second safety space and the safety space 30 is a first safety space. At the same time, it is conceivable to reduce the resolution in reduced operating mode so that only a whole person is detected as a triggering event in the access area 32, whereas in normal operating mode in the safety space 30, objects of smaller size can be detected as triggering events.

As soon as a person steps into the access area 32, the apparatus 10 can switch to normal operating mode and start monitoring the safety space 30 directly in front of the technical installation 26. Alternatively or in addition, one of the two processing channels of the apparatus 10 can be deactivated in reduced operating mode, so that components of the apparatus can be switched off. It is also conceivable that the apparatus is combined with another safety-related equipment, such as a safety gate 34 of the access area 32 of the technical installation 26, so that a transition from reduced operating mode to normal operating mode can be triggered by a signal from this further safety-related equipment.

It is understood that the above application scenario shows only one example of using the apparatus according to this disclosure. Other applications are conceivable in which further energy-saving measures can be used or in which the quality of the safety function can be adapted.

The phrase at least one of A, B, and C should be construed to mean a logical (A OR B OR C), using a non-exclusive logical OR, and should not be construed to mean "at least one of A, at least one of B, and at least one of C."

What is claimed is:

1. An apparatus for energy-efficient execution of a safety function used for safeguarding a technical installation, the apparatus comprising:
    a safety device configured to detect a triggering event of the safety function and
    a processing unit configured to execute a safety-related reaction of the safety function based on the detection by the safety device, wherein:
        the apparatus is selectively operable in a first operating mode and a second operating mode,
        in the first operating mode, the safety device and the processing unit operate according to a first quality level,
        in the second operating mode, at least one of (a) the safety device and (b) the processing unit operates according to a second quality level,
        the second quality level is lower than the first quality level,
        at least one of (a) the safety device and (b) the processing unit is operable with a reduced capacity in the second operating mode, wherein the reduced capacity saves energy;
    a defined safety space, within which the safety function is carried out, is variably adjustable,
    the defined safety space includes a first safety space and a second safety space, and
    the safety device is configured to detect the triggering event:
        in the first operating mode, in both the first and second safety spaces, and
        in the second operating mode, only in the first safety space.

2. The apparatus according to claim 1, wherein:
    the first quality level and the second quality level are defined by at least one of a reaction time and a detection capability and
    in the second operating mode, the at least one of the reaction time and the detection capability is reduced.

3. The apparatus according to claim 1, wherein the apparatus is operable in a third operating mode in which at least one of
    the detection by the safety device and
    the execution by the processing unit is deactivated.

4. The apparatus according to claim 1, wherein the reduced capacity includes at least one of
    a reduction of clock frequency,
    a shutdown of one or more processor cores,
    a reduction of a fan speed, and
    a deactivation of software modules.

5. The apparatus according to claim 1, wherein:
    at least one of (a) the safety device and (b) the processing unit is of multi-channel design and
    the reduced capacity is achieved by switching off one or more channels.

6. The apparatus according to claim 1, wherein the apparatus is configured to:
    receive a control command from a separate controller and
    select either of the first operating mode and the second operating mode based on the control command.

7. The apparatus according to claim 1, wherein the apparatus is configured to switch automatically between the first operating mode and the second operating mode.

8. The apparatus according to claim 7, wherein the apparatus is configured to report information regarding the selected operating mode to another device.

9. The apparatus according to claim 1, wherein the safety device comprises an imaging sensor.

10. The apparatus according to claim 1, wherein the safety device is configured to:
    detect a movement of an object outside the defined safety space within which the safety function is defined and
    switch between the first operating mode and the second operating mode in response to the detection.

11. The apparatus according to claim 1, wherein the safety device is configured to:
    detect brightness information and
    switch between the first operating mode and the second operating mode in response to the detection.

12. The apparatus according to claim 1, wherein the safety device is configured to:
    detect a defined gesture of a person and
    switch between the first operating mode and the second operating mode in response to the detection.

13. The apparatus according to claim 12, wherein the defined gesture is detected in a contactless manner.

14. The apparatus according to claim 1, wherein the apparatus is configured to, in response to the triggering event being detected in the first safety space, switch from the second operating mode to the first operating mode.

15. The apparatus according to claim 1, wherein the apparatus is configured to select, based on an operating state of the technical installation, one of the first operating mode and the second operating mode.

16. A method for energy-efficient execution of a safety function used for safeguarding a technical installation, the method comprising:
    detecting, by a safety device, a triggering event of the safety function;
    executing, by a processing unit, a safety-related reaction of the safety function based on the detection by the safety device; and
    operating the safety device and the processing unit in a first operating mode and a second operating mode, including:
        in the first operating mode, operating the safety device and the processing unit in accordance with a first quality level and
        in the second operating mode, operating at least one of the safety device and the processing unit in accordance with a second quality level and a reduced capacity that saves energy, wherein the second quality level is lower than the first quality level, wherein a defined safety space, within which the safety function is carried out, is variably adjustable and includes a first safety space and a second safety space, wherein the detecting the triggering event is performed, in the first operating mode, in both the first and second safety spaces, and wherein the detecting the triggering event is performed, in the second operating mode, in only the first safety space.

17. The method according to claim 16, further comprising, in response to the triggering event being detected in the first safety space, switching from the second operating mode to the first operating mode.

18. An apparatus for energy-efficient execution of a safety function used for safeguarding a technical installation, the apparatus comprising:
 a single safety device arranged in a single housing and configured to detect a triggering event of the safety function and
 a processing unit configured to execute a safety-related reaction of the safety function based on the detection by the safety device, wherein:
 the apparatus is selectively operable in a first operating mode and a second operating mode,
 in the first operating mode, the safety device and the processing unit operate according to a first quality level,
 in the second operating mode, at least one of (a) the safety device and (b) the processing unit operates according to a second quality level,
 the second quality level is lower than the first quality level,
 at least one of (a) the safety device and (b) the processing unit is operable with a reduced capacity in the second operating mode, wherein the reduced capacity saves energy,
 a defined safety space, within which the safety function is carried out, includes a first safety space and a second safety space, and
 the safety device is configured to detect the triggering event:
  in the first operating mode, in both the first and second safety spaces, and
  in the second operating mode, only in the first safety space.

19. The apparatus according to claim 18, wherein the apparatus is configured to, in response to the triggering event being detected in the first safety space, switch from the second operating mode to the first operating mode.

20. The apparatus according to claim 18, wherein the safety device is configured to at least one of:
 detect a movement of an object outside the defined safety space and switch between the first and second operating modes in response to the movement detection;
 detect brightness information and switch between the first and second operating modes in response to the brightness detection; and
 detect a defined gesture of a person and switch between the first and second operating modes in response to the gesture detection.

* * * * *